United States Patent [19]
Di Huo et al.

[11] Patent Number: 6,157,838
[45] Date of Patent: Dec. 5, 2000

[54] PARALLEL OPTIMIZATION OF WIRELESS NETWORKS

[75] Inventors: David Di Huo, Lafayette; Eshwar Pittampalli, Randolph, both of N.J.

[73] Assignee: Lucent Technologies Inc., Murray Hill, N.J.

[21] Appl. No.: 09/126,891

[22] Filed: Jul. 31, 1998

[51] Int. Cl.[7] .................................................. H04Q 7/22
[52] U.S. Cl. ........................................ 455/439; 455/67.1
[58] Field of Search .................... 455/67.1, 423, 455/424, 447, 446, 439

[56] References Cited

U.S. PATENT DOCUMENTS

| 5,570,412 | 10/1996 | LeBlanc | 455/560 |
| 5,752,164 | 5/1998 | Jones | 455/67.1 |
| 5,859,839 | 1/1999 | Ahlenius et al. | 455/424 |
| 5,943,617 | 8/1999 | Nakamura | 455/423 |
| 6,021,329 | 2/2000 | Kornestedt et al. | 455/447 |

FOREIGN PATENT DOCUMENTS

| 0 630 125 | 12/1994 | European Pat. Off. | H04B 17/00 |
| 0 774 876 | 5/1997 | European Pat. Off. | H04Q 7/34 |
| 0 837 615 | 4/1998 | European Pat. Off. | H04Q 7/34 |

*Primary Examiner*—Daniel S. Hunter
*Assistant Examiner*—Myron K. Wyche
*Attorney, Agent, or Firm*—Christopher N. Malvone

[57] ABSTRACT

Signal markers are placed in critical locations within the wireless network. Critical locations are locations where signals from base stations may be weak due to natural or man-made obstruction and locations where user demand for network resources may be particularly heavy. The signal markers collect data such as the signal strength or amplitude of signals from surrounding base stations, and the amount of user demand for access to the network. The signal markers then communicate this data to the mobile switching center. The mobile switching center analyzes the data and, if the data indicates unsatisfactory performance, determines new parameters for the base stations. The mobile switching center then communications the new parameters to each of the base stations where each of the base stations changes its performance in accordance with the new parameters. The signal markers then once again collect data and communicate that data to the mobile switching center where further changes to base station parameters are made as necessary.

9 Claims, 4 Drawing Sheets

PARALLEL OPTIMIZATION OF WIRELESS NETWORKS

BACKGROUND OF THE INVENTION

1. Field of the Invention

The present invention relates to wireless networks; more particularly, the optimization of wireless networks.

2. Description of the Related Art

When wireless networks such as cellular or PCS Personal Communication Services) networks are installed, their initial operating parameters are based on models that attempt to describe the physical environment in which the network will be operating. The operating parameters control characteristics such as signal transmit power and handoffs between cells. The model is provided with the available, but often incomplete, topographical information such as the location and size of hills or buildings that may block signal propagation. Using the model and available topographical and demographic data, network planning tools are used to predict the performance of the network, particularly, at "hot spots" where there is a large demand for network resources. Unfortunately, the model and topographical information used in the network planning is often inaccurate. In order to compensate for these inaccuracies, the wireless network is tuned after installation by adjusting the operating parameters to try to provide signal coverage to delivered areas and to provide sufficient network resources to hot spots. This process is typically referred to as optimization. The parameters include antenna height and tilt which control the footprint or area that will receive transmissions from the antenna Transmission power is also adjusted to vary cell size and to minimize interference caused by different transmitters or base stations within the network. Neighbor lists are adjusted so that a mobile in contact with a particular transmitter or base station, will know which other base stations are most likely to provide a successful handoff when it moves away from its present base station.

FIG. 1 illustrates a portion of a wireless network. Base stations 10, 12, 14, 16, 18, 20, and 22 each transmit signals to, and receive signals from, mobile units within the coverage area of each base station. The coverage area is indicated by the hexagon surrounding each of the base stations. The hexagons are a convenient representation for the coverage area of each base station; however, in the real world the shape is other than hexagonal due in part to the characteristics of the area surrounding the base station. Additionally, the location of the transmitter may not be in the center as shown in FIG. 1. The base stations are in communication with mobile switching center (MSC) 30. MSC 30 connects each base station to other communication networks such as the public switched telephone network or other MSCs of the same network and provides each base station with access to data bases that are used for tasks such as verifying the identity of a mobile unit before it is allowed to use the wireless network. As discussed above, the wireless network should be optimized to provide most areas with acceptable receive signals transmitted by the base station(s). In order to ensure that all areas receive signals from their respective base stations, route 40 is determined and is then driven by a vehicle carrying test equipment. Route 40 is chosen to pass through selected areas where signal reception may be weak or non-existent due to, for example, hills or buildings. Route 40 is also chosen to go through areas where user demand for network resources will be particularly heavy and areas that are important due to other reasons. As the vehicle carrying test equipment is driven along route 40, the wireless network performance is monitored. Test equipment records the vehicle's position, the signal strength received from base stations in the area, bit error rate, frame error rate, signal to interference ratio and dropped call information. By measuring base station signal strength, it can be determined whether signal strength for a particular base station should be increased or decreased, or whether the antenna associated with that base station should be adjusted to provide more uniform signal coverage. Additionally, by measuring the base station signal strength of several base stations, the neighbor list provided to the mobile units can be updated to include only the base stations that provide the best signals for that location.

Once the vehicle has driven the route and collected the test data, the data is brought to a processing center where the data is analyzed and new parameters are determined for the base stations. These parameters are then used to adjust the operation of each of the base stations. Once the base stations have been modified to operate with the new parameters, the test vehicle is once again driven along route 40 and data measurements are taken. These measurements are then once again brought back to the processing center where they are analyzed to provide new parameters for the base stations. The base stations are then modified in accordance with the parameters and once again the test vehicle drives route 40 to collect new data. This process is repeated many times until satisfactory performance is measured along route 40. This process is illustrated in FIG. 2.

FIG. 2 illustrates the steps described above in optimizing the wireless network. Step 60 involves selecting a cluster or group of cells as illustrated in FIG. 1 for testing. Step 62 involves determining route 40 in order to test performance within the cluster. Step 64 involves driving along route 40 to record data and step 66 involves processing the data at a processing center to determine system performance. Step 68 involves plotting a map that shows system performance relative to location along route 40. In step 70 it is determined whether the target performance has been reached. If the target performance has not been reached, step 72 is executed where problems are identified and new base station parameters are determined. Step 74 is then used to tune the base stations in accordance with the parameters determined in step 72. After step 74, the process is repeated starting with step 64 where route 40 is driven to collect test data. If at step 70, it is determined that the target performance has been reached, step 78 is executed where it is determined whether all the cluster of cells for the network system have been tested. If all the clusters have not been tested, step 60 is executed where a new cluster is selected for testing. If all the upper clusters have been tested, step 80 is executed where a global test of the network is conducted. This test involves monitoring of voice quality and verifying that the handoffs occur where expected. In step 82 it is determined whether target performance for the wireless network has been achieved. If the target has been achieved, the process ends until an update or other changes are required. If the target performance has not been reached, the process returns to step 60 where a cluster is selected to begin the testing and optimization of the system once again.

The above-described method for optimizing a wireless network is slow and costly. A vehicle must repeatedly be driven over a test route in order to collect data that is used to evaluate and then improve the network performance. Also, the trial and error approach underlying this method makes it very difficult to reach optimal performance leaving networks with less than optimal performance. Repeatedly driving this route requires a great deal of time and keeps an expensive wireless network from generating significant revenue for periods of time that may last up to several weeks.

SUMMARY OF THE INVENTION

The present invention provides an efficient, fast, and more economical way to optimize a wireless network. Signal markers are placed in critical locations within the wireless network. Critical locations are locations where signals from base stations may be weak due to natural or man-made obstruction and locations where user demand for network resources may be particularly heavy. The signal markers collect the signal strength from surrounding base stations. The signal markers then communicate this data to the mobile switching center. The mobile switching center analyzes the data and, if the data indicates unsatisfactory performance, determines new operating parameters for the base stations. The MSC then communications the new parameters to each of the base stations where each of the base stations changes its configuration in accordance with the parameters. Signal markers then once again collect data and communicate that data to the mobile switching center where further changes to base station parameters are made as necessary. By using signal markers, it is not necessary to drive a route such as route 40 for collecting any data. The route 40 is driven only for the mechanical purposes of installing the signal markers before the test and removing them after the test, if they are not intended for long term use. By eliminating the number of times a route must be driven for collecting data, the time and cost associated with optimizing a wireless network is greatly reduced.

BRIEF DESCRIPTIONS OF THE DRAWINGS

DETAILED DESCRIPTION OF THE INVENTION

Figure 1:
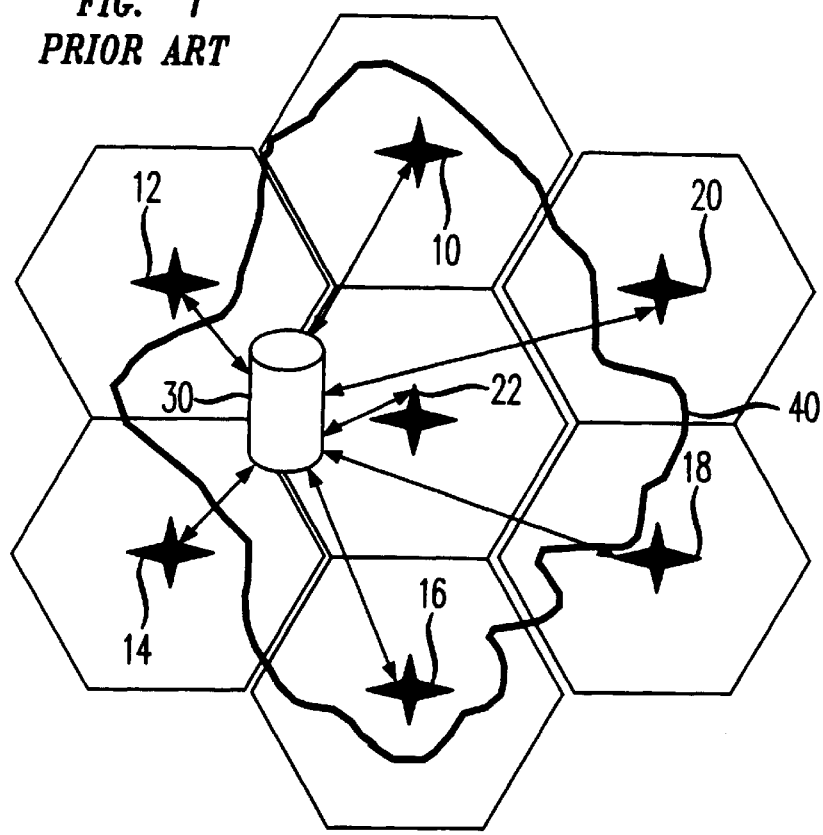
FIG. 1 illustrates a prior art method of optimizing a wireless network.
Figure 3:
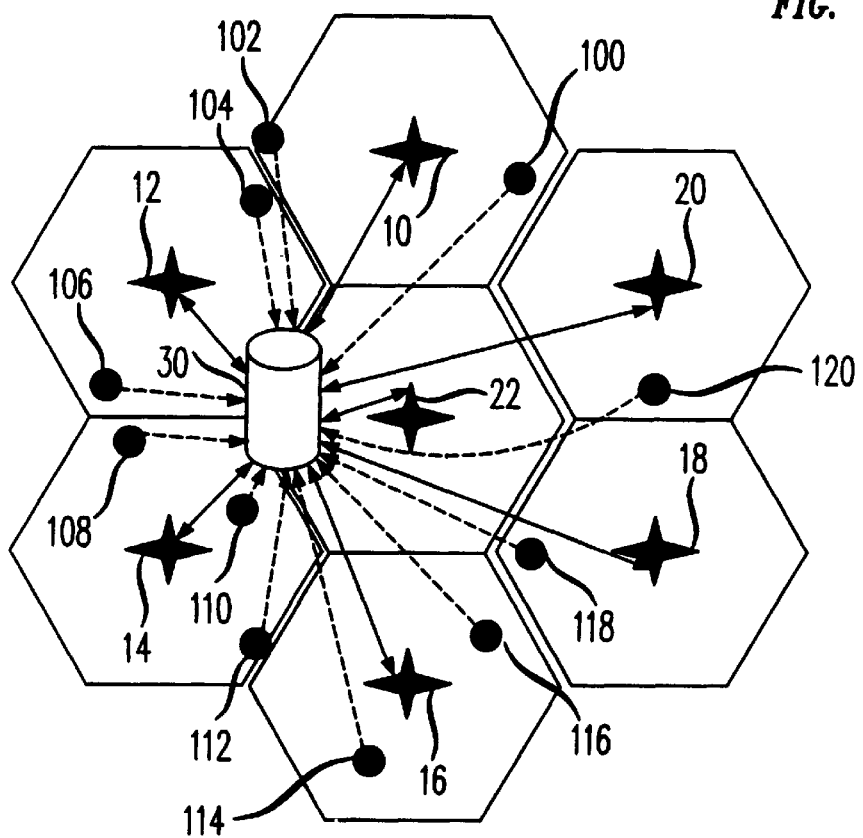
FIG. 3 illustrates a portion of a wireless network using signal markers for network optimization.
Figure 2:
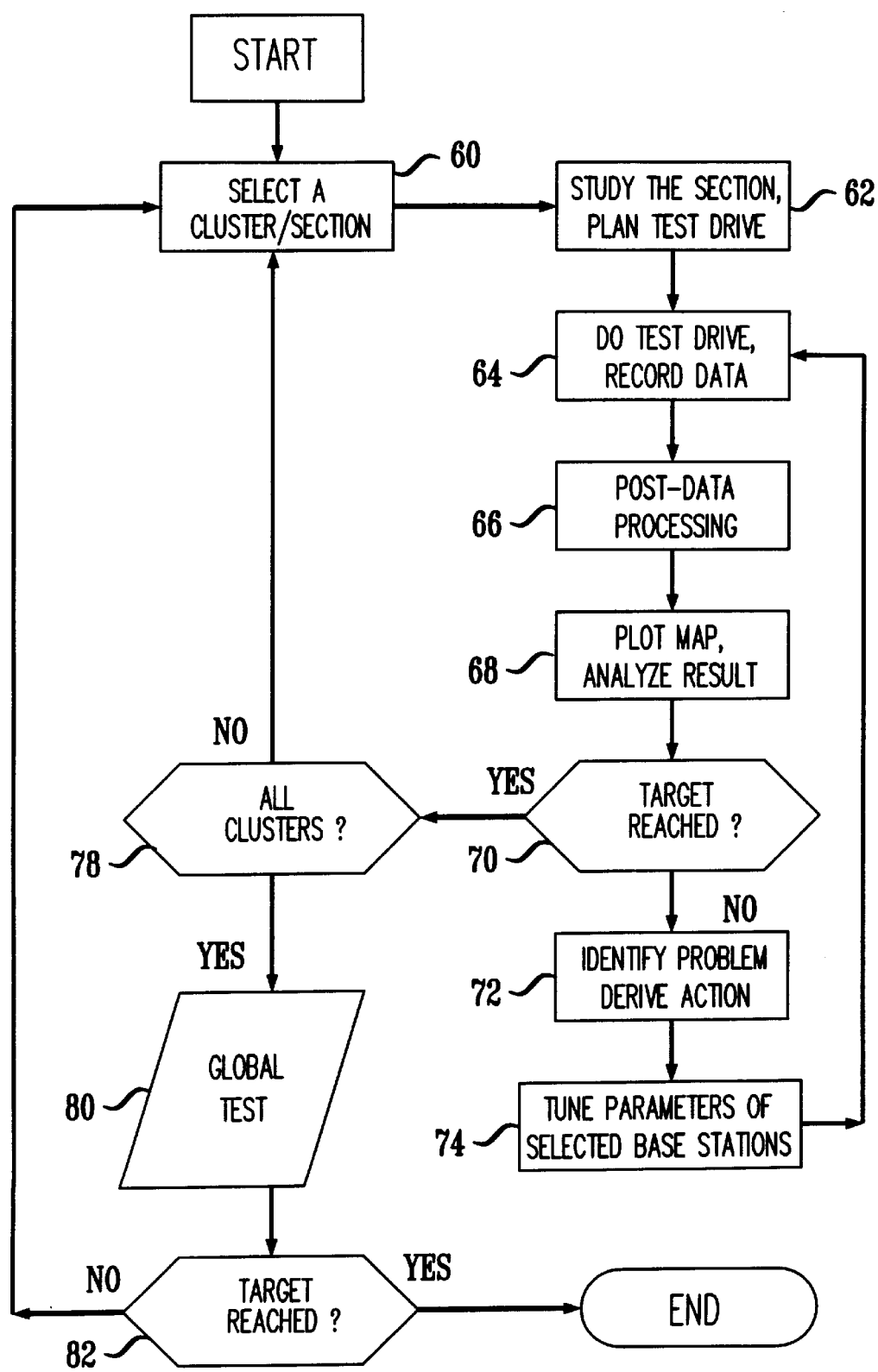
FIG. 2 is a flowchart of a prior art method for optimizing a wireless network.

FIG. 3 illustrates a cluster or portion of a wireless network where signal markers are used to optimize network performance. Base stations 10, 12, 14, 16, 18, 20 and 22 are illustrated each with their hexagon represented coverage areas. Each of the base stations is in communication with mobile switching center 30. Signal markers 100, 102, 104, 106, 108, 110, 112, 114, 116, 118, and 120 are positioned in areas where the signal received from one or more base stations may be weak, or in areas where user communication demands are expected to be heavy or other areas of special interest. Each of the signal markers is in communication with mobile switching center 30. MSC 30 contains a processor or is in communication with a processor that is normally used to determine if the network is performing as required and to optimize base station parameters using test data collected from the network. When the network is tested, signal markers 102 through 120 collect data such as signal strength, frame error rate, bit error rate, call drop rate and failed call attempt rate and handoff drop rate, and signal or amplitude of signals from surrounding base stations. Additionally, data indicative of the rates of transmission or periodicity of signals from surrounding base stations, and the number of requests for access to the network is collected. Each of the signal markers then relays this information over a communication link to the mobile switching center. The mobile switching center then determines if the data indicates that performance is unsatisfactory. If performance is unsatisfactory, the mobile switching center computes a new set of base station parameters using the data provided by the signal markers. The mobile switching center then communicates the new base station parameters to each of the base stations over their respective communication links with each of the base stations. (It should be noted that each base station receives its own set of parameters.) Each of the base stations then adjusts its operating characteristics in accordance with the new parameters. The new parameters include information such as antenna tilt, antenna height, antenna azimuth, transmission power or transmission signal amplitude and neighbor list. Using these parameters, the footprint or illumination area provided by each base station is adjusted to attempt to eliminate areas where a base station signal cannot be received by a mobile as specified in the network plan, and to adjust coverage areas so that areas of heavy user demand are distributed among several base stations or cells.

Figure 4:
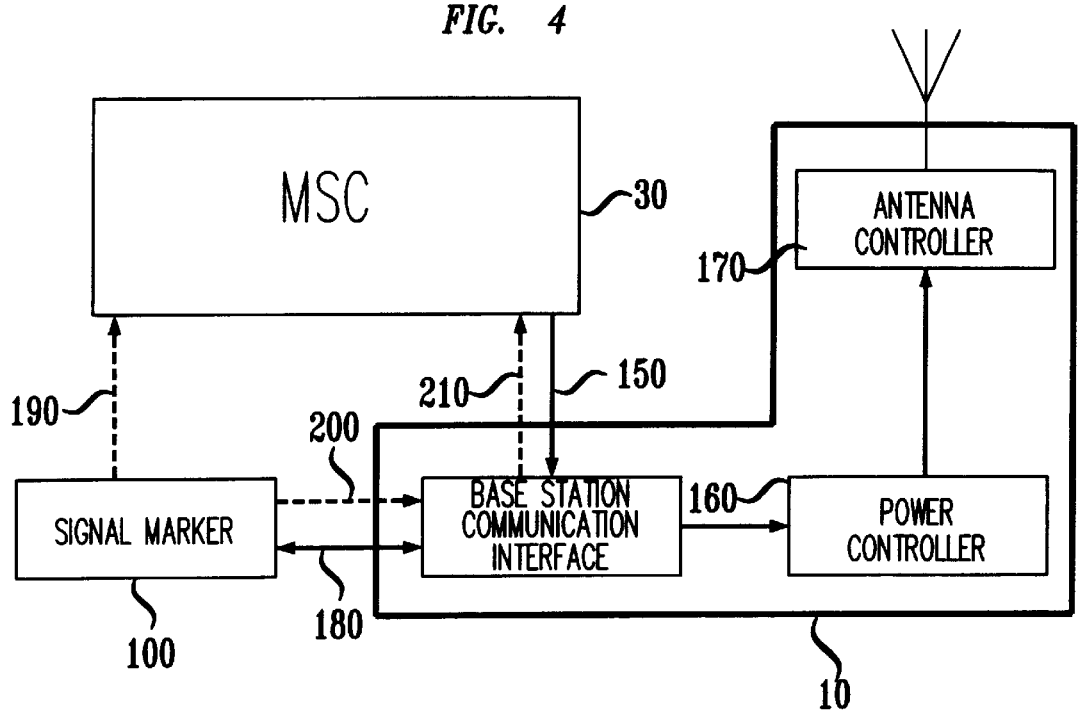
FIG. 4 illustrates communication links between the mobile switching center, the base station, and signal markers.

FIG. 4 illustrates the communication links between the base station, signal marker and mobile switching center. The mobile switching center 30 is in communication with base station 10 over an existing bidirectional control link 150 that is used in most wireless networks. This link is normally used to exchange signaling protocol and to control mobile unit access to the network. The present invention uses control link 150 to provide parameter updates to base station 10, the parameter updates are used, for example, to control power controller 160 and antenna controller 170. Signal marker 100 receives signals from and/or transmits signals to base station 10 over RF (radio frequency) link 180. RF link 180 is typically one of links that is used by a mobile user when communicating with the base station; however, other RF links such as control, paging or pilot channels may be used. Signal marker 100 uses link 180 to record data such as the signal strength or amplitude, periodicity, frame error rate, bit error rate, call drop rate, handoff drop rate, and signal to interference ratio. Similar performance metrics can be measured by the base station in reverse link by utilizing the test signals transmitted by the signal marker. Signal marker 100 also determines whether base station 10 or other base stations can respond to signals transmitted from signal marker 100. The data collected by signal marker 100 is transmitted over communication channel 190 to mobile switching center 30. Communication channel 190 may be a wireless communication channel, an optical communication channel a data network or a communication channel using a network such as the public switched telephone network. The other signal markers similarly collect data and communicate their data to mobile switching center 30. Mobile switching center 30 contains a processor, or is in communication with an adjunct processor, that analyzes the data to determine if performance is satisfactory, and if performance is unsatisfactory it uses the data to calculate or determine new parameters for the base stations. The new base station parameters are then transferred from mobile switching center 30 to base stations such as base station 10 over control link 150.

It is also possible to provide communications between signal marker 100 and mobile switching center 30 via an RF link between signal marker 100 and base station 10, and then via an upward portion of control link 150. For example, RF link 200 may be an RF link that is usually used for communications between mobile unit and base station 10. Information passed over communication channel 200 may then be passed to mobile switching center 30 by base station 10 using upward portion 210 of control link 150 between mobile switching center 30 and base station 10.

Figure 5:
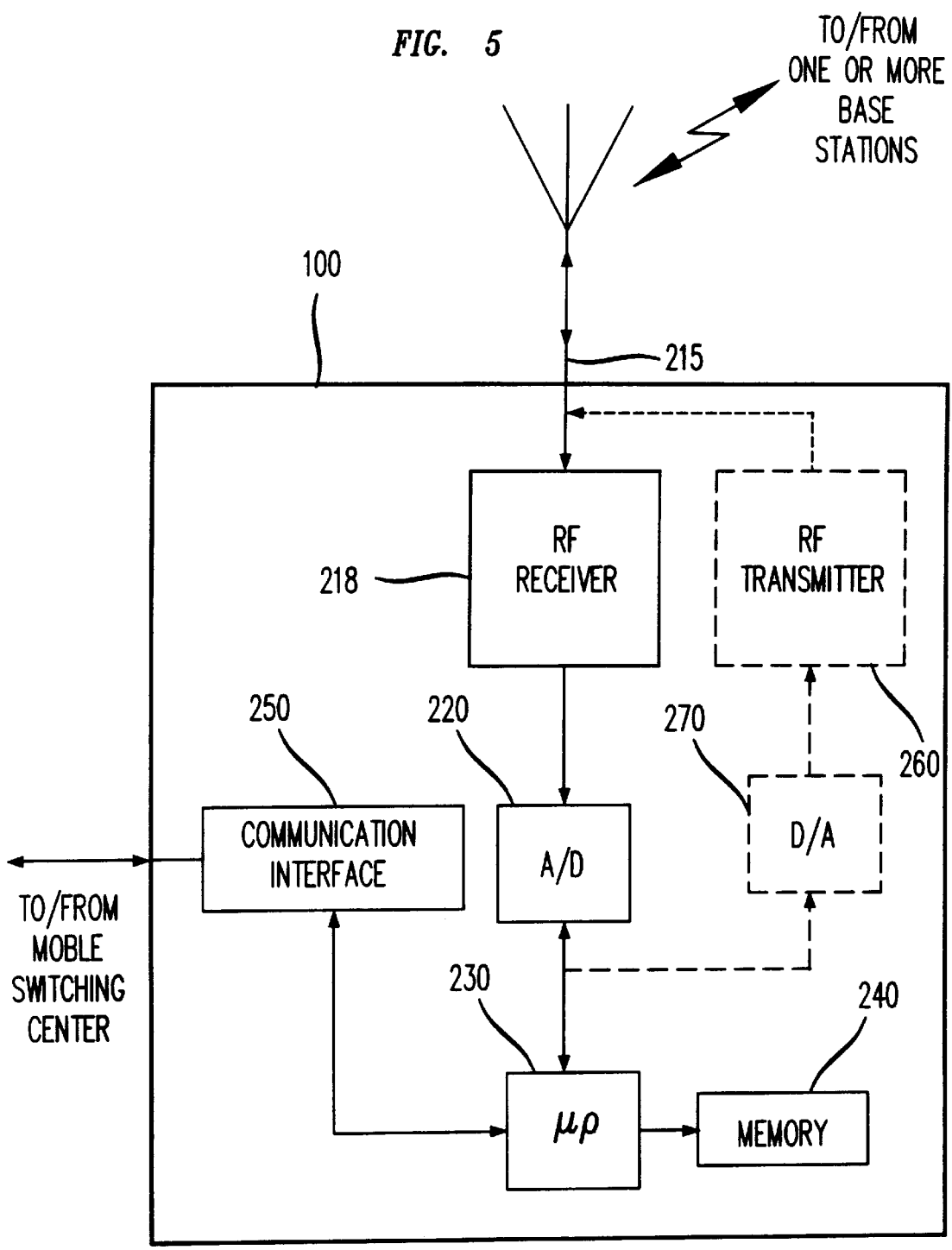
FIG. 5 is a block diagram of a signal marker.

FIG. 5 is a block diagram of a signal marker. Signal marker 100 includes antenna 215 which is used to receive RF (radio frequency) signals from one or more base stations. The signal from antenna 215 is passed to RF receiver 218. RF receiver 218 demodulates the signal and converts the signal to a frequency band compatible with analog to digital converter 220. Analog to digital converter 220 provides a digital representation of the signal received on antenna 215 to microprocessor 230. Microprocessor 230 then uses the switch information provided by analog to digital converter 220 to analyze the signal received on antenna 215. The analysis performed by microprocessor 230 may include determining signal strength or amplitude, and the rate of transmission of the signal received on antenna 215. Microprocessor 230 is in communication with memory 240. Memory 240 may be used to store data received from analog to digital converter 220, the results of the analysis performance by microprocessor 230, or programming information to be executed by microprocessor 230. Microprocessor 230 communicates with a mobile switching center via communication interface 250. Communication interface 250 provides the necessary signal conversions for transmission over the type of communication link between the signal marker and the mobile switching station. For example, if the communication link is a radio frequency link, communication interface 250 includes an RF transmitter, and if the communication interface is bidirectional, interface 250 will also include an RF frequency receiver. Likewise, if the communication link with the mobile switching center is optical, a optical transmitter and receiver will be included in communication interface 250. Communication interface 250 may also include a buffer memory such as a first in/first out memory and/or a parallel to serial converter to convert serial data to parallel data or vice versa. Additionally, if analog data is to be transmitted over the communication link to the mobile switching center, a digital to analog converter is included in the communication interface 250 for data transmitted to the mobile switching center, and if the link is bidirectional, an analog to digital converter is also included in communication interface 250. It should be noted that signal marker 100 may also transmit the signals to one or more base stations. If signal marker 100 is used to transmit signals to one or more base stations, RF transmitter 260 is included in the signal marker. Additionally, digital to analog converter 270 should be included to provide a signal path between microprocessor 230 and RF transmitter 260.

Figure 6:
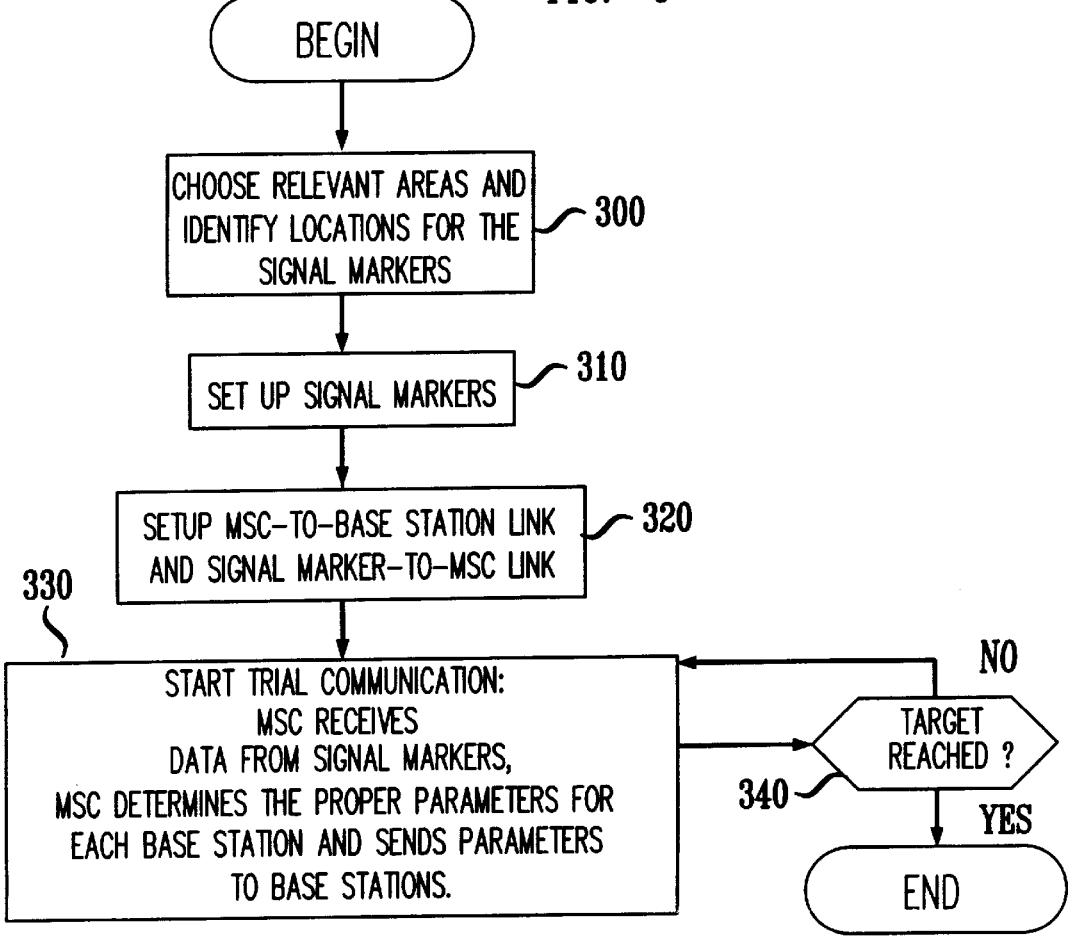
FIG. 6 is a flowchart illustrating a method for performing network optimization using signal markers.

FIG. 6 is a flowchart illustrating the process to optimize the wireless network using signal markers. In step 300 the locations for placing the signal markers are identified by identifying the areas where the coverage is expected according to prior network planning but the signal received from one or more base stations may be weak, or in areas where user communication demands are expected to be heavy or in areas of special interest. In step 310 the signal markers are installed in designated locations. In step 320 the mobile switching center to base station link, and the signal marker to mobile switching center links are verified. In step 330, the system is tested by transmitting signals from the base stations that are to be received by the signal markers. The signal markers analyze the signals to determine values for characteristics of signals from the base stations. These characteristics include, for example, signal strength or amplitude, frame error rate, bit error rate, call drop, handoff drop rate, and signal to interference ratio. The signal markers may also transmit signals to one or more base stations and then receive and analyze the signals transmitted by the base stations in response to the signal marker's transmissions. The signal marker records data such as values associated with the amplitude and/or periodicity of the signal transmitted by the signal marker that caused a base station to respond, and the indentity of the base station that responded. Additionally, the signal marker may monitor and count the number of requests for service transmitted by mobile users. The signal marker then stores the data which includes values of different characteristics of signals received and transmitted by the signal marker, the identity of the device that transmitted the signals (if available from information included in the transmitted signal), the identity of the signal marker, the location of the signal marker (the signal marker may use a GPS receiver to determine its position), and the time at which the data was collected. The signal markers then transfer the data to the mobile switching center. If the data indicates unsatisfactory performance, the mobile switching center determines a new set of parameters for each base station using the data from the signal markers. The new parameters are then transferred from the mobile switching center to each of the base stations where they are used to modify the performance of the base station. In step 340, it is determined whether target performance has been reached. This is determined by examining data that is collected by the signal markers and transferred to the mobile switching center. If the target performance has been reached, the process is ended for this cluster and then repeated for other clusters within the network. If the process does not result in target performance being reached, step 330 is repeated.

The invention claimed is:

1. A wireless communication network, comprising:
 a base station that transmits at least one base station signal;
 a mobile switching center that communicates at least one antenna parameter to the base station; and
 a first signal marker that determines a first value for each of at least one of a plurality of signal characteristics of the at least one base station signal to form a first value set and communicates the first value set to the mobile switching center, where the mobile switching center determines the at least one antenna parameter using the first value set.

2. The wireless communication network of claim 1, further comprising:
 a second signal marker that determines a second value for each of at least one of the plurality of signal characteristics of the at least one base station signal to form a second value set and communicates the second value set to the mobile switching center, where the mobile switching center determines the at least one antenna parameter using the second value set.

3. The wireless communication network of claim 1, wherein at least two of the first values in the first value set correspond to the same signal characteristic of two different base station signals transmitted by the base station.

4. The wireless communication network of claim 1, wherein at least two of the first values in the first value set correspond to two different signal characteristics of the same base station signal.

5. The wireless communication network of claim 1, wherein the at least one parameter specifies an antenna height.

6. The wireless communication network of claim 1, wherein the at least one parameter specifies an antenna elevation angle.

7. The wireless communication network of claim 1, wherein the at least one parameter specifies an antenna azimuth.

8. The wireless communication network of claim 1, wherein the at least one parameter specifies an antenna beam shape.

9. The wireless communication network of claim 1, wherein the at least one parameter specifies an antenna beam position.

* * * * *